Figure 1:
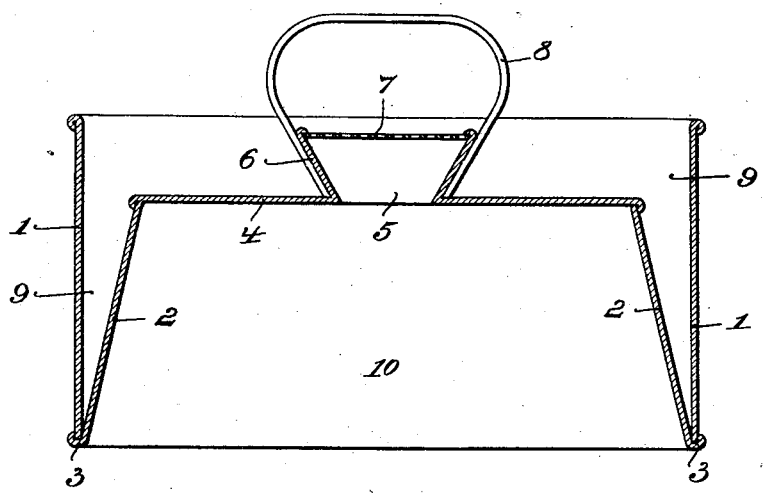
Figure 2:
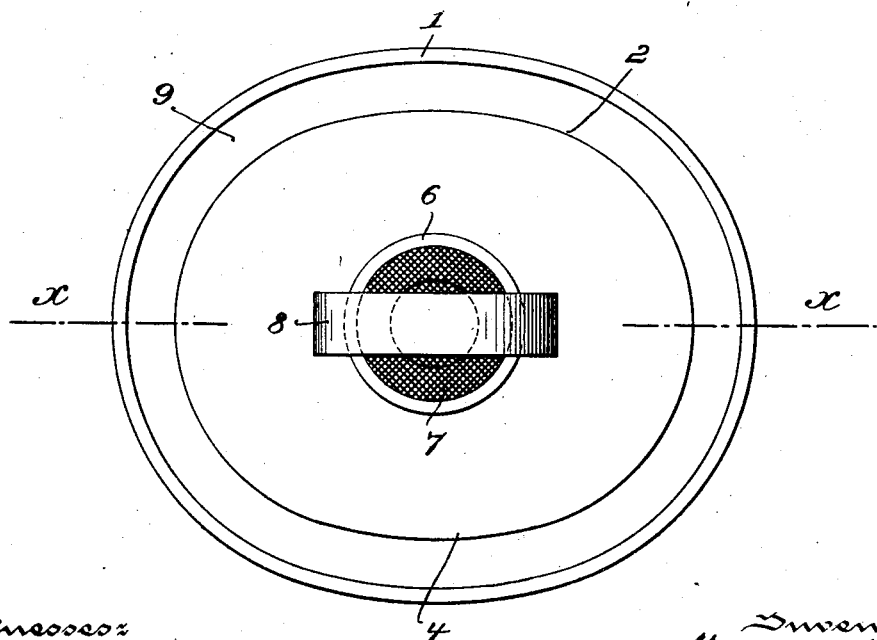

No. 734,148. PATENTED JULY 21, 1903.
M. M. WAITE.
COVERING DEVICE FOR FOOD STUFFS, &c.
APPLICATION FILED NOV. 20, 1901.
NO MODEL.

Witnesses:
Wilhelm Vogt
Jas. C. Wobensmith.

Inventor:
Mary M. Waite
By J. Walter Douglas
Attorney.

THE NORRIS PETERS CO., PHOTO-LITHO., WASHINGTON, D. C.

No. 734,148. Patented July 21, 1903.

UNITED STATES PATENT OFFICE.

MARY MARIA WAITE, OF IPSWICH, ENGLAND, ASSIGNOR TO EDWARD KENDALL STOREY, OF DALTON-IN-FURNESS, ENGLAND.

COVERING DEVICE FOR FOODSTUFFS, &c.

SPECIFICATION forming part of Letters Patent No. 734,148, dated July 21, 1903.

Application filed November 20, 1901. Serial No. 82,972. (No model.)

*To all whom it may concern:*

Be it known that I, MARY MARIA WAITE, a subject of the King of Great Britain, and a resident of Ipswich, in the county of Suffolk, England, have invented a new or Improved Covering Device for Foodstuffs and the Like, of which the following is a specification.

My invention relates to a new or improved device for covering, heating, cooling, and ventilating foodstuffs and the like.

In the accompanying sheet of drawings, Figure I is a longitudinal vertical section taken on the line $x\ x$ of Fig. II, and Fig. II a plan of a device constructed according to my invention.

It consists, as illustrated, of an outer casing 1, which is open at the top and an inner casing 2, which is continuously joined all around the bottom to the outer casing, as shown at 3. The inner casing is provided with a cover 4, which is pierced by a hole 5, which is surmounted by a tube or funnel 6, and the top of the funnel is covered with a perforated sheet or grating 7. The apparatus is also provided with a handle 8. It will be seen that within the outer casing there is a space 9, which constitutes a receiver suitable for containing any solid or liquid substance—such as ice or hot water, for example—which is suitable for cooling or warming the apparatus and the chamber 10 inclosed by the inner casing. This chamber 10 is the receptacle for the foodstuffs or the like and is ventilated by the grating 7. It is obvious that if a liquid is used in the receiving-space 9 it must not be filled above the level of this grating. The device is adapted to be placed over the said food after the manner of a dish-cover, and it can be readily removed or its position altered by means of the handle 8. Any other suitable form of handle may be substituted for that shown in the figures.

The perforated sheet or grating 7 is an important feature in connection with the invention, since it serves to keep insects away from the food while admitting air. It is recognized that to properly preserve food from decay flies and other insects should be rigidly excluded from the food. Where a portion of animal food is open to the access of flies, it will be found that decay and deterioration set up much earlier than where the food is screened from the visits of the flies.

I am aware that dish-covers somewhat resembling the cover of the present invention have been described; but in none of such covers was there employed a grating serving the twofold function of a screen to prevent access of insects to the food and as a means for ventilating the food in conjunction with the other elements, as hereinafter claimed.

Having thus described my invention, what I claim as new, and desire to secure by Letters Patent, is—

1. A dish-cover, comprising an outer casing open at its top, an inner casing projecting upward and inward from the base of the outer casing, both casings being united at their lower edges, a cover for the inner casing arranged in a plane below the upper edge of the outer casing and having an opening, a funnel-shaped tube fitted in the opening and projecting upward therefrom and a grating closing the upper end of said tube, substantially as and for the purposes described.

2. A dish-cover, comprising an outer casing open at its top, an inner casing projecting upward and inward from the base of the outer casing, both casings being united at their lower edges, a cover for the inner casing arranged in a plane below the upper edge of the outer casing and having an opening, a funnel-shaped tube fitted in the opening and projecting upward therefrom, a grating closing the upper end of said tube, and a handle projecting upward from said tube, substantially as and for the purposes described.

In witness whereof I have hereunto set my hand in presence of two witnesses.

MARY MARIA WAITE.

Witnesses:
JAMES H. RYLEY,
GERRARD B. STEWARD.